(12) United States Patent
Yano et al.

(10) Patent No.: US 10,516,174 B2
(45) Date of Patent: *Dec. 24, 2019

(54) METAL SHEET FOR SEPARATORS OF POLYMER ELECTROLYTE FUEL CELLS, AND METAL SHEET FOR MANUFACTURING THE SAME

(71) Applicant: JFE STEEL CORPORATION, Chiyoda-ku, Tokyo (JP)

(72) Inventors: Takayoshi Yano, Tokyo (JP); Shin Ishikawa, Tokyo (JP); Chikara Kami, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/579,666

(22) PCT Filed: Jul. 29, 2016

(86) PCT No.: PCT/JP2016/003526
§ 371 (c)(1),
(2) Date: Dec. 5, 2017

(87) PCT Pub. No.: WO2017/026104
PCT Pub. Date: Feb. 16, 2017

(65) Prior Publication Data
US 2018/0175401 A1    Jun. 21, 2018

(30) Foreign Application Priority Data
Aug. 12, 2015  (JP) .................. 2015-159556

(51) Int. Cl.
*H01M 8/0228* (2016.01)
*H01M 8/0206* (2016.01)
(Continued)

(52) U.S. Cl.
CPC ....... *H01M 8/0228* (2013.01); *H01M 8/0206* (2013.01); *H01M 8/0215* (2013.01); *H01M 8/1018* (2013.01); *H01M 2008/1095* (2013.01)

(58) Field of Classification Search
None
See application file for complete search history.

(56) References Cited

U.S. PATENT DOCUMENTS 6,660,419 B1   12/2003   Nishida et al.
9,799,896 B2   10/2017   Yano et al.
(Continued)

FOREIGN PATENT DOCUMENTS

CN    102859768 A    1/2013
EP      2560225 A1    2/2013
(Continued)

OTHER PUBLICATIONS

Oct. 11, 2016, International Search Report issued in the International Patent Application No. PCT/JP2016/003526.
(Continued)

*Primary Examiner* — Basia A Ridley
*Assistant Examiner* — Heng M. Chan
(74) *Attorney, Agent, or Firm* — Kenja IP Law PC

(57) ABSTRACT

A metal sheet for separators of polymer electrolyte fuel cells comprises: a substrate made of metal; and a surface-coating layer with which a surface of the substrate is coated, with a strike layer in between, wherein a coating ratio of the strike layer on the substrate is 2% to 70%, the strike layer is distributed in a form of islands, and a maximum diameter of the islands of the strike layer as coating portions is 1.00 μm or less and is not greater than a thickness of the surface-coating layer.

3 Claims, 1 Drawing Sheet

(51) Int. Cl.
*H01M 8/0215* (2016.01)
*H01M 8/1018* (2016.01)

(56) References Cited

U.S. PATENT DOCUMENTS

| | | |
|---|---|---|
| 2003/0113577 A1 | 6/2003 | Zheng et al. |
| 2004/0197661 A1 | 10/2004 | Utsunomiya et al. |
| 2013/0177837 A1 | 7/2013 | Nishiyama et al. |
| 2013/0244129 A1 | 9/2013 | Shibuya et al. |
| 2016/0122891 A1 | 5/2016 | Tani et al. |
| 2016/0240866 A1 | 8/2016 | Yano et al. |
| 2017/0033372 A1 | 2/2017 | Yano et al. |

FOREIGN PATENT DOCUMENTS

| | | | |
|---|---|---|---|
| EP | 2896499 A1 | | 7/2015 |
| EP | 3133682 A1 | | 2/2017 |
| EP | 3285319 A1 | | 2/2018 |
| JP | H08180883 A | | 7/1996 |
| JP | H10228914 A | | 8/1998 |
| JP | 2006097088 A | * | 4/2006 |
| JP | 2008078104 A | | 4/2008 |
| JP | 2009032671 A | | 2/2009 |
| JP | 2010024508 A | | 2/2010 |
| JP | 2012018864 A | | 1/2012 |
| JP | 2012178324 A | | 9/2012 |
| JP | 2013118096 A | | 6/2013 |
| JP | 2013243113 A | * | 12/2013 |
| JP | 5700183 B1 | | 4/2015 |
| JP | 5796694 B1 | | 10/2015 |
| KR | 10-2012-122090 | * | 4/2011 |
| KR | 1020130004355 A | | 1/2013 |
| WO | 2011132797 A1 | | 10/2011 |
| WO | 2014189081 A1 | | 11/2014 |
| WO | 2015059857 A1 | | 4/2015 |

OTHER PUBLICATIONS

Apr. 19, 2018, Partial Supplementary European Search Report (R 164 EPC) issued by the European Patent Office in the corresponding European Patent Application No. 16834806.8.

Jun. 14, 2018, Extended European Search Report issued by the European Patent Office in the corresponding European Patent Application No. 16834806.8.

Sep. 13, 2018, Office Action issued by the United States Patent and Trademark Office in the U.S. Appl. No. 15/302,825.

Jun. 28, 2019, Office Action issued by the Korean Intellectual Property Office in the corresponding Korean Patent Application No. 10-2018-7002472 with English language concise statement of relevance.

Dec. 21, 2018, Office Action issued by the Korean Intellectual Property Office in the corresponding Korean Patent Application No. 10-2018-7002472 with English language concise statement of relevance.

* cited by examiner

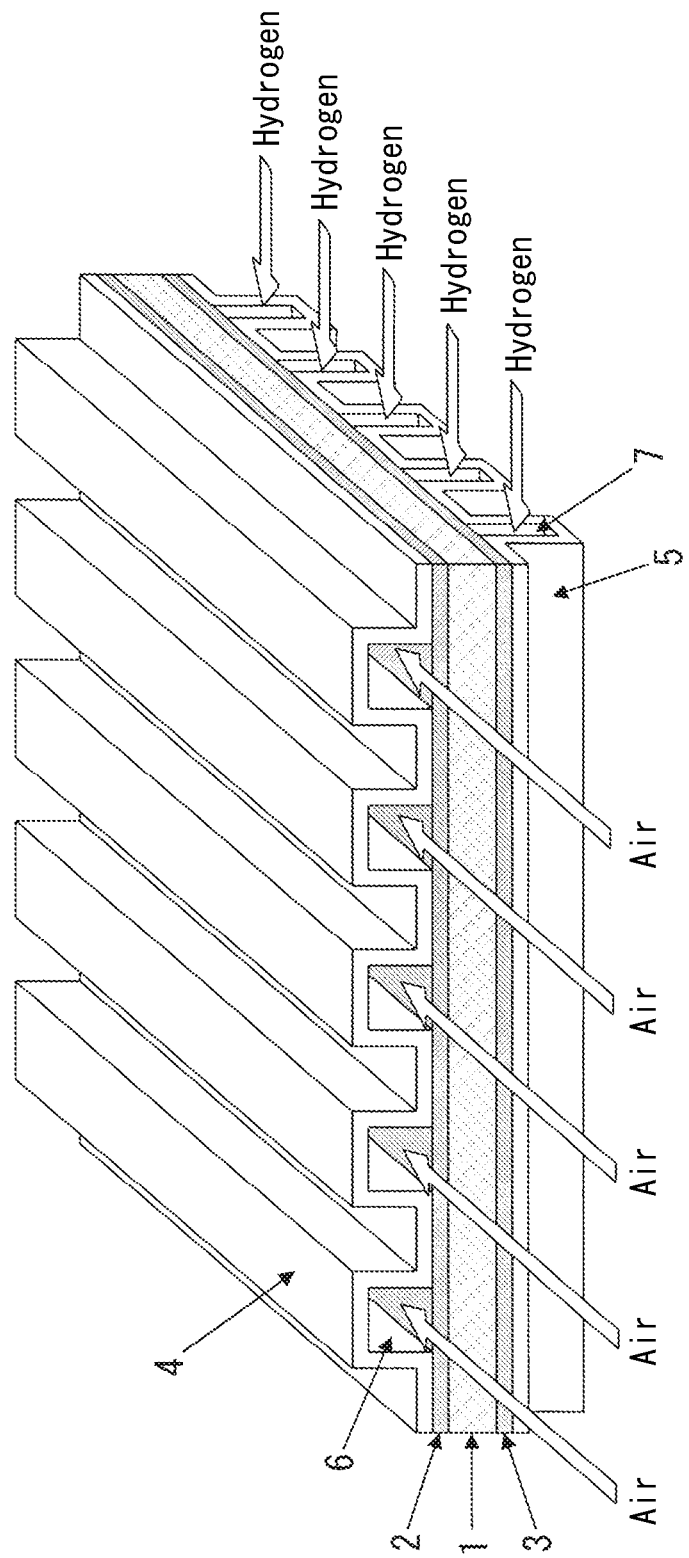

METAL SHEET FOR SEPARATORS OF POLYMER ELECTROLYTE FUEL CELLS, AND METAL SHEET FOR MANUFACTURING THE SAME

TECHNICAL FIELD

The disclosure relates to a metal sheet for separators of polymer electrolyte fuel cells having excellent corrosion resistance and adhesion property, and a metal sheet for manufacturing the same.

BACKGROUND

In recent years, fuel cells that have excellent generation efficiency and emit no $CO_2$ are being developed for global environment protection. Such a fuel cell generates electricity from $H_2$ and $O_2$ through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators.

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Of these fuel cells, polymer electrolyte fuel cells have, for example, the following advantages over other fuel cells.

(a) The fuel cell operating temperature is about 80° C., so that electricity can be generated at significantly low temperature.

(b) The fuel cell body can be reduced in weight and size.

(c) The fuel cell can be started promptly, and has high fuel efficiency and power density.

Polymer electrolyte fuel cells are therefore expected to be used as power sources in electric vehicles, home or industrial stationary generators, and portable small generators.

A polymer electrolyte fuel cell extracts electricity from $H_2$ and $O_2$ via a polymer membrane. As illustrated in FIG. 1, a membrane-electrode joined body 1 is sandwiched between gas diffusion layers 2 and 3 (for example, carbon paper) and separators (bipolar plates) 4 and 5, forming a single component (a single cell). An electromotive force is generated between the separators 4 and 5.

The membrane-electrode joined body 1 is called a membrane-electrode assembly (MEA). The membrane-electrode joined body 1 is an assembly of a polymer membrane and an electrode material such as carbon black carrying a platinum catalyst on the front and back surfaces of the membrane, and has a thickness of several 10 μm to several 100 μm. The gas diffusion layers 2 and 3 are often integrated with the membrane-electrode joined body 1.

In the case of actually using polymer electrolyte fuel cells, several tens to hundreds of single cells such as the above are typically connected in series to form a fuel cell stack and put to use.

The separators 4 and 5 are required to function not only as (a) partition walls separating single cells, but also as (b) conductors carrying generated electrons, (c) air passages 6 through which $O_2$ (air) flows and hydrogen passages 7 through which $H_2$ flows, and (d) exhaust passages through which generated water or gas is exhausted (the air passages 6 or the hydrogen passages 7 also serve as the exhaust passages).

The separators therefore need to have excellent durability and electric conductivity.

Regarding durability, about 5000 hours are expected in the case of using the polymer electrolyte fuel cell as a power source in an electric vehicle, and about 40000 hours are expected in the case of using the polymer electrolyte fuel cell as a home stationary generator or the like. Since the proton conductivity of the polymer membrane (electrolyte membrane) decreases if metal ions are eluted due to corrosion, the separators need to be durable for long-term generation.

Regarding electric conductivity, the contact resistance between the separator and the gas diffusion layer is desirably as low as possible, because an increase in contact resistance between the separator and the gas diffusion layer causes lower generation efficiency of the polymer electrolyte fuel cell. A lower contact resistance between the separator and the gas diffusion layer contributes to better power generation property.

Polymer electrolyte fuel cells using graphite as separators have already been in practical use. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, JP H8-180883 A (PTL 1) discloses a technique of using, as separators, a metal such as stainless steel or a titanium alloy that easily forms a passive film.

JP H10-228914 A (PTL 2) discloses a technique of plating the surface of a metal separator such as an austenitic stainless steel sheet (SUS304) with gold to reduce the contact resistance and ensure high output.

CITATION LIST

Patent Literatures

PTL 1: JP H8-180883 A
PTL 2: JP H10-228914 A
PTL 3: JP 2012-178324 A
PTL 4: JP 2013-118096 A

SUMMARY

Technical Problem

With the technique disclosed in PTL 1, however, the formation of the passive film causes an increase in contact resistance, and leads to lower generation efficiency. The metal material disclosed in PTL 1 thus has problems such as high contact resistance and low corrosion resistance as compared with the graphite material.

With the technique disclosed in PTL 2, a thin gold plating is hard to be kept from the formation of pinholes, and a thick gold plating is problematic in terms of an increase in cost.

In view of this, we previously proposed in JP 2012-178324 A (PTL 3) "a metal sheet for separators of polymer electrolyte fuel cells wherein a layer (hereafter also referred to as "Sn alloy layer") made of a Sn alloy layer is formed on the surface of a substrate made of metal and the layer includes conductive particles". Through the development of the metal sheet for separators of polymer electrolyte fuel cells described in PTL 3, we succeeded in improving the corrosion resistance in the use environment of separators of polymer electrolyte fuel cells.

However, the layer (hereafter also referred to as "surface-coating layer") of the surface-coating layer such as the Sn alloy layer formed on the surface of the metal material for separators of polymer electrolyte fuel cells is required not only to have predetermined corrosion resistance, but also to be thinner in terms of reducing surface coating cost and improving manufacturability (reduction in surface-coating layer formation time).

We accordingly proposed in JP 2013-118096 A (PTL 4) a surface coating method for separators of fuel cells wherein the surface of a substrate made of high Cr stainless steel is subjected to anodic electrolysis that induces a Cr transpassive dissolution reaction and then immediately subjected to $Ni_3Sn_2$ layer formation, without the formation of an intermediate layer. We thus succeeded in obtaining separators of polymer electrolyte fuel cells having excellent corrosion resistance even in the case where the surface-coating layer made of the Sn alloy layer such as the $Ni_3Sn_2$ layer is made thinner.

In the fuel cell manufacturing process, high adhesion between the substrate and the surface-coating layer is necessary so that the surface-coating layer does not peel off the substrate. With the technique described in PTL 4, however, the adhesion property is not always sufficient, for example, in the process of forming the separator into a desired shape, in the process of assembling the fuel cell, or when the fuel cell vibrates violently during use, and there is a possibility that the surface-coating layer peels.

Thus, while the surface-coating layer formed on the surface of the substrate in the case of using a metal material such as stainless steel as the material of separators of polymer electrolyte fuel cells needs to have both corrosion resistance and adhesion property as well as being thinner, such need has not been fulfilled adequately.

It could therefore be helpful to provide a metal sheet for separators of polymer electrolyte fuel cells having both excellent corrosion resistance in the use environment of separators of polymer electrolyte fuel cells and excellent adhesion property between a substrate and a surface-coating layer even in the case where the surface-coating layer is made thinner.

It could also be helpful to provide a metal sheet for manufacturing the metal sheet for separators of polymer electrolyte fuel cells.

Solution to Problem

We used various metal sheets as the material of separators of polymer electrolyte fuel cells, and studied various surface-coating layer formation processes for these metal sheets.

As a result, we made the following discoveries.

(1) First, to improve the adhesion property, we attempted to form a strike layer made of a metal layer of Ni, Cu, or the like as a base layer on the surface of a substrate made of metal, prior to the formation of a surface-coating layer. We then discovered that forming the strike layer as the base layer on the surface of the metal substrate significantly improves the adhesion property of the surface-coating layer.

(2) Next, we attempted to form a thinner surface-coating layer after forming the strike layer, and discovered the following. When the surface-coating layer is made thinner, defects from the surface-coating layer to the metal substrate increase, and the strike layer is continuously corroded through these defects. This causes the surface-coating layer above the strike layer to exfoliate, exposing the metal substrate to the separator use environment. As a result, the corrosion resistance degrades significantly.

(3) We carried out further research to prevent the degradation of the corrosion resistance in the case of making the surface-coating layer thinner.

We consequently discovered the following: By limiting the coating ratio (coverage factor) of the strike layer on the substrate to the range of 2% to 70% and also limiting the coating form of the strike layer so that the strike layer is distributed in the form of islands and the maximum diameter of the island-like coating portions of the strike layer is 1.00 μm or less and is not greater than the thickness of the surface-coating layer formed on the strike layer, the continuous corrosion of the strike layer is suppressed, and as a result the degradation of the corrosion resistance associated with the exfoliation of the surface-coating layer is effectively prevented and the adhesion property is further enhanced.

(4) The reason why limiting the coating ratio of the strike layer on the substrate and the coating form of the strike layer as mentioned above suppresses the continuous corrosion of the strike layer is considered as follows.

By limiting the coating ratio of the strike layer on the substrate to the range of 2% to 70%, a discontinuous portion such as a non-coating area of the strike layer appears on the surface of the metal substrate, and this discontinuous portion of the strike layer acts as an area that inhibits the propagation of the corrosion. Hence, the continuous corrosion of the strike layer can be suppressed even in the case where the surface-coating layer is made thinner.

Moreover, by limiting the coating form of the strike layer so that the strike layer is distributed in the form of islands and the maximum diameter of the island-like coating portions of the strike layer is 1.00 μm or less and is not greater than the thickness of the surface-coating layer, discontinuous portions such as non-coating areas of the strike layer are formed throughout the surface of the substrate, as a result of which the degradation of the corrosion resistance can be prevented more effectively. This also makes the whole interface between the metal substrate and the surface-coating layer rough, and so ensures higher adhesion property by the anchor effect.

(5) We also discovered that, while the strike layer may be a metal layer of Ni, Cu, Ag, Au, or the like or an alloy layer containing at least one selected from these elements, a Ni—P strike layer made of an alloy layer of Ni and P is particularly suitable as the strike layer for its low material cost and excellent corrosion resistance. We further discovered that, by limiting the P content in the Ni—P strike layer to the range of 5 mass % to 22 mass %, excellent corrosion resistance can be maintained more stably even in the event of long exposure to high potential in the separator use environment.

The reason for this is considered as follows. By limiting the P content in the Ni—P strike layer to the range of 5 mass % to 22 mass %, a more stable Ni—P compound in the separator use environment is formed, with it being possible to further suppress the corrosion of the strike layer.

(6) We additionally discovered that, in the case where the surface-coating layer is a Sn alloy layer, coating the surface of the layer with a Sn-containing oxide layer further improves the corrosion resistance.

The reason for this is considered as follows. Since the Sn-containing oxide layer is very stable in the separator use environment, coating the surface of the Sn alloy layer with the Sn-containing oxide layer suppresses the corrosion of the Sn alloy layer effectively. The corrosion resistance can be further improved by such an effect.

The disclosure is based on the aforementioned discoveries.

We thus provide:

1. A metal sheet for separators of polymer electrolyte fuel cells, comprising: a substrate made of metal; and a surface-coating layer with which a surface of the substrate is coated, with a strike layer in between, wherein a coating ratio of the strike layer on the substrate is 2% to 70%, the strike layer is distributed in a form of islands, and a maximum diameter of the islands of the strike layer as coating portions is 1.00 μm or less and is not greater than a thickness of the surface-coating layer.

2. The metal sheet for separators of polymer electrolyte fuel cells according to 1., wherein the strike layer contains at least one element selected from the group consisting of Ni, Cu, Ag, and Au.

3. The metal sheet for separators of polymer electrolyte fuel cells according to 1., wherein the strike layer is made of an alloy layer of Ni and P, and has a P content in a range of 5 mass % to 22 mass %.

4. The metal sheet for separators of polymer electrolyte fuel cells according to any one of 1. to 3., wherein the surface-coating layer is made of a metal layer, an alloy layer, a metal oxide layer, a metal nitride layer, a metal carbide layer, a carbon material layer, a conductive polymer layer, an organic resin layer containing a conductive substance, or a mixed layer thereof.

5. The metal sheet for separators of polymer electrolyte fuel cells according to any one of 1. to 3., wherein the surface-coating layer is a layer made of a Sn alloy layer, and the metal sheet for separators of polymer electrolyte fuel cells further comprises a Sn-containing oxide layer on a surface of the surface-coating layer.

6. A metal sheet for manufacturing the metal sheet for separators of polymer electrolyte fuel cells according to any one of 1. to 5., comprising: a substrate made of metal; and a strike layer on a surface of the substrate, wherein a coating ratio of the strike layer on the substrate is 2% to 70%, the strike layer is distributed in a form of islands, and a maximum diameter of the islands of the strike layer as coating portions is 1.00 μm or less.

Advantageous Effect

It is possible to obtain a separator of a fuel cell having excellent corrosion resistance and adhesion property, and thus obtain a polymer electrolyte fuel cell having excellent durability at low cost.

BRIEF DESCRIPTION OF THE DRAWINGS

In the accompanying drawings:

FIG. 1 is a schematic diagram illustrating the basic structure of a fuel cell.

DETAILED DESCRIPTION

Detailed description is given below.

(1) Metal Sheet Used as Substrate

A metal sheet used as a substrate in the disclosure is not limited, but a stainless steel sheet (ferritic stainless steel sheet, austenitic stainless steel sheet, dual-phase stainless steel sheet), a titanium sheet, a titanium alloy sheet, and the like having excellent corrosion resistance are particularly advantageous.

For example, as the stainless steel sheet, SUS447J1 (Cr: 30 mass %, Mo: 2 mass %), SUS445J1 (Cr: 22 mass %, Mo: 1 mass %), SUS443J1 (Cr: 21 mass %), SUS439 (Cr: 18 mass %), SUS316L (Cr: 18 mass %, Ni: 12 mass %, Mo: 2 mass %), or the like is suitable. SUS447J1 containing about 30 mass % Cr has high corrosion resistance, and so is particularly advantageous as the substrate for separators of polymer electrolyte fuel cells used in an environment where high corrosion resistance is required. As the titanium sheet, JIS 1 type or the like is suitable. As the titanium alloy sheet, JIS 61 type or the like is suitable.

In view of the installation space or weight when stacking fuel cells, the sheet thickness of the metal sheet for separators is preferably in the range of 0.03 mm to 0.30 mm. If the sheet thickness of the metal sheet for separators is less than 0.03 mm, the production efficiency of the metal sheet decreases. If the sheet thickness of the metal sheet for separators is more than 0.30 mm, the installation space or weight when stacking fuel cells increases. The sheet thickness of the metal sheet for separators is more preferably 0.03 mm or more and 0.10 mm or less.

(2) Surface-Coating Layer

A surface-coating layer with which the surface of the substrate is coated is not limited, but a material excellent in corrosion resistance and conductivity in the use environment (pH: 3 (sulfuric acid environment), use temperature: 80° C.) of separators of polymer electrolyte fuel cells is preferably used. For example, a metal layer, an alloy layer, a metal oxide layer, a metal carbide layer, a metal nitride layer, a carbon material layer, a conductive polymer layer, an organic resin layer containing a conductive substance, or a mixed layer thereof is suitable.

Examples of the metal layer include metal layers of Au, Ag, Cu, Pt, Pd, W, Sn, Ti, Al, Zr, Nb, Ta, Ru, Ir, and Ni. A metal layer of Au or Pt is particularly suitable.

Examples of the alloy layer include Sn alloy layers of Ni—Sn ($Ni_3Sn_2$, $Ni_3Sn_4$), Cu—Sn ($Cu_3Sn$, $Cu_6Sn_5$), Fe—Sn ($FeSn$, $FeSn_2$), Sn—Ag, and Sn—Co, and alloy layers of Ni—W, Ni—Cr, and Ti—Ta. An alloy layer of Ni—Sn or Fe—Sn is particularly suitable.

Examples of the metal oxide layer include metal oxide layers of $SnO_2$, $ZrO_2$, $TiO_2$, $WO_3$, $SiO_2$, $Al_2O_3$, $Nb_2O_5$, $IrO_2$, $RuO_2$, $PdO_2$, $Ta_2O_5$, $Mo_2O_5$, and $Cr_2O_3$. A metal oxide layer of $TiO_2$ or $SnO_2$ is particularly suitable.

Examples of the metal nitride layer and the metal carbide layer include metal nitride layers and metal carbide layers of TiN, CrN, TiCN, TiAlN, AlCrN, TiC, WC, SiC, $B_4C$, molybdenum nitride, CrC, TaC, and ZrN. A metal nitride layer of TiN is particularly suitable.

Examples of the carbon material layer include carbon material layers of graphite, diamond, amorphous carbon, diamond-like carbon, carbon black, fullerene, and carbon nanotube. A carbon material layer of graphite or diamond-like carbon is particularly suitable.

Examples of the conductive polymer layer include conductive polymer layers of polyaniline and polypyrrole.

The organic resin layer containing a conductive substance contains at least one conductive substance selected from a metal, an alloy, a metal oxide, a metal nitride, a metal carbide, a carbon material, and a conductive polymer included in the aforementioned metal layer, alloy layer, metal oxide layer, metal nitride layer, metal carbide layer, carbon material layer, and conductive polymer layer, and contains at least one organic resin selected from epoxy resin, phenol resin, polyamide-imide resin, polyester resin, polyphenylene sulfide resin, polyamide resin, urethane resin, acrylic resin, polyethylene resin, polypropylene resin, carbodiimide resin, phenol epoxy resin, and the like. As the organic resin layer containing a conductive substance, for example, graphite-dispersed phenol resin or carbon black-dispersed epoxy resin is suitable.

As the conductive substance, a metal and a carbon material (in particular, graphite, carbon black) are suitable. The content of the conductive substance is not limited, as long as predetermined conductivity is obtained in separators of polymer electrolyte fuel cells.

Examples of the mixed layer include a mixed layer of a TiN-dispersed Ni—Sn alloy.

For the formation of the surface-coating layer on the surface of the metal substrate, a method such as plating, physical vapor deposition (PVD), chemical vapor deposition (CVD), electrodeposition, thermal spraying, surface melting treatment, or coating may be used depending on the type of the surface-coating layer to be formed.

For example, in the case of providing the surface-coating layer that is the metal layer or the alloy layer, plating is suitable. In this case, by a conventionally known plating method the substrate is immersed in a plating bath adjusted to a predetermined composition and subjected to electroplating, electroless plating, or hot dip coating. The thickness of such a surface-coating layer is preferably 0.1 μm or more and 5.0 μm or less. If the thickness of the surface-coating layer is less than 0.1 μm, coating defects increase and the corrosion resistance tends to degrade. If the thickness of the surface-coating layer is more than 5.0 μm, the coating cost increases and manufacturability decreases. The thickness of the surface-coating layer is more preferably 0.5 μm or more. The thickness of the surface-coating layer is more preferably 3.0 μm or less.

In the case of providing the metal oxide layer, the metal nitride layer, the metal carbide layer, or the carbon material layer, physical vapor deposition (PVD) or chemical vapor deposition (CVD) is suitable. The thickness of such a surface-coating layer is preferably in the range of 0.05 μm to 1.0 μm, for the same reason as above.

In the case of providing the conductive polymer layer, electropolymerization is suitable. The thickness of such a surface-coating layer is preferably in the range of 0.1 μm to 5.0 μm, for the same reason as above.

In the case of providing the organic resin layer containing a conductive substance, coating (a method of applying a predetermined coating solution and then firing) is suitable. The thickness of such a surface-coating layer is preferably in the range of 1.0 μm to 50.0 μm, for the same reason as above. The thickness of the surface-coating layer is more preferably 1.0 μm or more. The thickness of the surface-coating layer is more preferably 10.0 μm or less.

(Strike Layer)

Forming a strike layer between the metal substrate and the surface-coating layer improves the adhesion between the surface-coating layer and the substrate. The reason why forming the strike layer between the metal substrate and the surface-coating layer improves the adhesion between the surface-coating layer and the substrate is considered as follows.

In the case where there is no strike layer, an inactive passive film or the like tends to be formed on the surface of the metal substrate, making it difficult to achieve high adhesion. In the case where the strike layer is provided, on the other hand, the formation of the passive film or the like is suppressed and the surface of the metal substrate is kept from becoming inactive, as a result of which the adhesion between the substrate and the surface-coating layer is improved.

Moreover, a strike layer whose surface is uneven is more advantageous because the adhesion is further improved by the anchor effect.

The disclosed metal sheet for separators of polymer electrolyte fuel cells thus has excellent adhesion between the substrate and the surface-coating layer, and therefore is advantageous in the process of forming the separator into a desired shape or the process of assembling the fuel cell where high adhesion is required, or when the fuel cell vibrates violently during use.

It is very important to limit the coating ratio of the strike layer on the substrate and the coating form of the strike layer as follows:

the coating ratio of the strike layer on the substrate: 2% to 70%.

By limiting the coating ratio of the strike layer on the substrate to this range, the corrosion resistance in the separator use environment can be maintained even in the case where the surface-coating layer is made thinner. The reason for this is considered as follows.

Typically, when the thickness of the surface-coating layer is reduced, in-layer defects from the surface-coating layer to the substrate increase. Through these defects, the strike layer between the metal substrate and the surface-coating layer is widely corroded continuously in the surface direction, causing the surface-coating layer above the strike layer to exfoliate from the metal substrate. When the surface-coating layer exfoliates, the substrate is exposed to the separator use environment, and as a result the corrosion resistance decreases.

Limiting the coating ratio of the strike layer on the substrate to the aforementioned range, however, allows the strike layer to be formed discontinuously on the surface of the substrate. In other words, a discontinuous portion such as a non-coating area of the strike layer appears in part of the surface of the substrate. This discontinuous portion of the strike layer acts as an area that inhibits the propagation of the corrosion. Hence, the continuous corrosion of the strike layer is suppressed even in the case where the surface-coating layer is made thinner. The degradation of the corrosion resistance can be prevented in this way.

If the coating ratio of the strike layer on the substrate is less than 2%, the adhesion between the metal substrate and the surface-coating layer decreases. If the coating ratio of the strike layer on the substrate is more than 70%, the corrosion resistance cannot be maintained in the case where the thickness of the surface-coating layer is reduced. Accordingly, the coating ratio of the strike layer on the substrate is limited to the range of 2% to 70%. The coating ratio of the strike layer on the substrate is preferably 5% or more. The coating ratio of the strike layer on the substrate is preferably 60% or less. The coating ratio of the strike layer on the substrate is more preferably 10% or more. The coating ratio of the strike layer on the substrate is more preferably 50% or less. The coating ratio of the strike layer on the substrate is further preferably 15% or more. The coating ratio of the strike layer on the substrate is further preferably 40% or less.

the strike layer being distributed in the form of islands with the maximum diameter of the island-like coating portions of the strike layer being 1.00 μm or less and being not greater than the thickness of the surface-coating layer.

The strike layer needs to have a coating form in which the strike layer is distributed in the form of islands on the surface of the substrate and the maximum diameter of the island-like coating portions of the strike layer is 1.00 μm or less.

By limiting the coating form of the strike in this way, discontinuous portions such as non-coating areas of the strike layer are formed throughout the surface of the substrate. This suppresses the continuous corrosion of the strike layer more effectively, and prevents the degradation of the corrosion resistance more effectively. This also makes the whole interface between the metal substrate and the surface-coating layer rough, and so enhances the adhesion property by the anchor effect. Here, if the maximum diameter of the island-like coating portions is greater than the thickness of the surface-coating layer, the discontinuity of the strike layer with respect to the thickness of the surface-coating layer decreases relatively, and the corrosion resistance cannot be maintained. The maximum diameter of the island-like coating portions therefore needs to be not greater than the thickness of the surface-coating layer. The thickness of the surface-coating layer mentioned here is the average thickness of the surface-coating layer.

Thus, the coating form of the strike layer is limited so that the strike layer is distributed in the form of islands on the surface of the substrate and the maximum diameter of the island-like coating portions of the strike layer is 1.00 μm or less and is not greater than the thickness of the surface-coating layer.

The maximum diameter of the island-like coating portions of the strike layer is preferably limited to 0.50 μm or less and not greater than the thickness of the surface-coating layer. The maximum diameter of the island-like coating portions of the strike layer is more preferably limited to 0.10 μm or less and not greater than the thickness of the surface-coating layer.

The specific shape of each island-like coating portion is not limited, and may be any of circular, elliptic, polygonal, ameboid (a shape extending in a plurality of irregular directions), etc. The diameter of each island-like coating portion is defined as the diameter of the smallest circle that touches two or more points on the perimeter of the island-like coating portion and completely encloses the island-like coating portion.

The strike layer is preferably a metal layer of Ni, Cu, Ag, Au, or the like or an alloy layer containing at least one selected from these elements. A Ni strike or a Ni—P strike made of an alloy layer of Ni and P is more preferable in terms of material cost.

In the case of a Ni—P strike, it is further preferable to limit the P content in the Ni—P strike layer to the range of 5 mass % to 22 mass %.

P content in Ni—P strike layer: 5 mass % to 22 mass %

By limiting the P content in the Ni—P strike layer to this range, excellent corrosion resistance can be maintained more stably even in the event of long exposure to high potential in the separator environment. The reason for this is considered as follows.

By limiting the P content in the Ni—P strike layer to the range of 5 mass % to 22 mass %, a more stable Ni—P compound in the separator use environment is formed, with it being possible to suppress the corrosion of the strike layer effectively for a longer time.

If the P content in the Ni—P strike layer is less than 5 mass %, the improvement effect is insufficient. If the P content in the Ni—P strike layer is more than 22 mass %, the composition of the Ni—P strike tends to be not uniform. Such a range is also not preferable in terms of maintaining excellent corrosion resistance in the event of long exposure to high potential in the separator environment. Therefore, the P content in the Ni—P strike layer is preferably limited to the range of 5 mass % to 22 mass %. The P content in the Ni—P strike layer is more preferably 7 mass % or more. The P content in the Ni—P strike layer is more preferably 20 mass % or less. The P content in the Ni—P strike layer is further preferably 10 mass % or more. The P content in the Ni—P strike layer is further preferably 18 mass % or less.

The method of forming the strike layer may be a conventionally known plating method whereby electroplating or electroless plating is performed in a plating bath adjusted to an appropriate composition. For example in the case of electroplating, to limit the coating form of the strike layer as mentioned above, the time of retention in the plating bath, i.e. the electroplating time, and the current density during electroplating need to be controlled appropriately.

The electroplating time and the current density during electroplating influence the coating ratio of the strike layer on the substrate, and the current density during electroplating also influences the maximum diameter of the island-like coating portions. When the electroplating time is longer and the current density is higher, the coating ratio of the strike layer on the substrate is higher. Moreover, a higher current density typically facilitates nucleation, which contributes to a smaller maximum diameter of the island-like coating portions.

For example, in the case of forming a Ni strike, a Ni—P strike, or a Cu strike, a current density of 6 A/dm$^2$ or more and an electroplating time of 1 second or more are preferable in terms of achieving the desired coating form, although fine adjustment is needed for differences depending on the structure of the electroplating apparatus such as the distance between electrodes and the size of the plating tank. A current density of 7 A/dm$^2$ or more and an electroplating time of 1 second or more are more preferable. If the current density is excessively high, the adhesion decreases. The upper limit of the current density is therefore preferably about 10 A/dm$^2$. The electroplating time is preferably 180 seconds or less. The electroplating time is more preferably 60 seconds or less.

In the case of forming an Ag strike or an Au strike, on the other hand, a current density of 4 A/dm$^2$ or more and an electroplating time of 1 second or more are preferable. A current density of 5 A/dm$^2$ or more and an electroplating time of 1 second or more are more preferable. If the current density is excessively high, the adhesion decreases. The upper limit of the current density is therefore preferably about 10 A/dm$^2$. The electroplating time is preferably 180 seconds or less. The electroplating time is more preferably 60 seconds or less.

The P content in the Ni—P strike layer is adjustable by the P concentration in the plating bath or the current density in plating.

(4) Sn-Containing Oxide Layer

In the disclosed metal sheet for separators, in the case where the surface-coating layer is a layer (Sn alloy layer) made of a Sn alloy layer, the surface of the Sn alloy layer is preferably coated with a Sn-containing oxide layer. This further improves the corrosion resistance for long time use in the separator use environment.

The Sn-containing oxide layer with which the surface of the Sn alloy layer is coated is not a natural oxide layer created in the atmospheric environment but an oxide layer deliberately formed by a process such as immersion in an acid solution. The thickness of the natural oxide layer is typically about 2 nm to 3 nm.

The main component of the Sn-containing oxide layer is preferably $SnO_2$. The thickness of the Sn-containing oxide layer is preferably 5 nm or more. The thickness of the Sn-containing oxide layer is preferably 100 nm or less. The thickness of the Sn-containing oxide layer is more preferably 10 nm or more. The thickness of the Sn-containing oxide layer is more preferably 30 nm or less. If the Sn-containing oxide layer is excessively thick, the conductivity decreases. If the Sn-containing oxide layer is excessively thin, the corrosion resistance improvement effect in the separator use environment cannot be achieved.

The reason why coating the surface of the Sn alloy layer with the Sn-containing oxide layer improves the corrosion resistance for long time use in the separator use environment is considered as follows. Since the Sn-containing oxide layer is very stable in the separator use environment, coating the surface of the surface-coating layer with the Sn-containing oxide layer effectively suppresses the corrosion of the surface-coating layer effectively.

Here, the oxide layer is deliberately formed by a process such as immersion in an acid solution instead of using a natural oxide layer, for the following reason. Through such a process, the oxide layer can be uniformly and accurately formed on the surface of the surface-coating layer, with it being possible to suppress the corrosion of the surface-coating layer very effectively.

The Sn-containing oxide layer may be formed by a method of immersion in an acid aqueous solution having oxidizability such as hydrogen peroxide or nitric acid, or a method of anodic electrolysis.

For example, the Sn-containing oxide layer can be formed by applying anodic electrolysis, in a sulfuric acid aqueous solution of a temperature of 60° C. and a pH of 1, to the metal sheet for separators having the surface-coating layer for 5 minutes with a current density of +1 $mA/cm^2$.

The method of forming the Sn-containing oxide layer is not limited to the above. Other examples include physical vapor deposition (PVD), chemical vapor deposition (CVD), and coating.

(5) Other Features

After forming the surface-coating layer on the surface of the metal substrate with the strike layer in between or after forming the Sn alloy layer on the surface of the metal substrate with the strike layer in between and then forming the Sn-containing oxide layer, a conductive layer with lower electric resistance may be further formed on the surface-coating layer or the Sn-containing oxide layer, to improve the conductivity which is one of the required properties of separators. For example, the surface-coating layer or the Sn-containing oxide layer may be coated with a metal layer, a conductive polymer layer, an alloy layer including conductive particles, or a polymer layer including conductive particles, in order to reduce the contact resistance.

EXAMPLES

Separators of polymer electrolyte fuel cells are used in a severe corrosion environment of about 80° C. in temperature and 3 in pH, and therefore excellent corrosion resistance is required. Moreover, high adhesion between the metal substrate and the surface-coating layer is required so that the surface-coating layer does not peel off the metal substrate in the fuel cell manufacturing process such as the process of forming the separator into a desired shape or the process of assembling the fuel cell. In view of these required properties, the following two types of evaluation were conducted on the below-mentioned samples.

(1) Evaluation of Corrosion Resistance (Stability in Separator Use Environment)

Each sample was immersed in a sulfuric acid aqueous solution of a temperature of 80° C. and a pH of 3 and subjected to the application of a constant potential of 0.9 V (vs. SHE) for 100 hours using Ag/AgCl (saturated KCl aqueous solution) as a reference electrode, and the total electric charge conducted for 100 hours was measured. Based on the total electric charge conducted for 100 hours, the corrosion resistance after 100 hours in the separator use environment was evaluated by the following criteria.

Excellent: the total electric charge conducted for 100 hours was less than 15 $mC/cm^2$.

Good: the total electric charge conducted for 100 hours was 15 $mC/cm^2$ or more and less than 100 $mC/cm^2$.

Poor: the total electric charge conducted for 100 hours was 100 $mC/cm^2$ or more.

(2) Evaluation of Adhesion Property

The adhesive face of Scotch tape was adhered to the surface of each sample obtained by forming a surface-coating layer on the surface of a metal substrate, in an area of 20 mm×20 mm. The Scotch tape was then removed, and the adhesion property was evaluated by the following criteria.

Good: the surface-coating layer did not peel after the removal of the Scotch tape.

Poor: the surface-coating layer peeled after the removal of the Scotch tape.

Example 1

Each of SUS447J1 (Cr: 30 mass %) of 0.05 mm in sheet thickness and titanium JIS 1 type of 0.05 mm in sheet thickness as a substrate was subjected to appropriate pretreatment such as degreasing, and then a strike layer with the coating form listed in Table 1 was formed on the substrate using the plating bath composition and plating condition listed in Table 1 and mentioned below. Next, a surface-coating layer with the average thickness listed in Table 1 was formed on the substrate having the strike layer, to obtain a metal sheet for separators.

For the metal layer and alloy layer of Au and $Ni_3Sn_2$ and TiN-dispersed $Ni_3Sn_2$, the surface-coating layer was formed using the below-mentioned plating bath composition and plating condition. For the metal oxide layers of $TiO_2$ and $SnO_2$, the surface-coating layer was formed by physical vapor deposition (PVD). For the metal nitride layer (TiN), the surface-coating layer was formed by physical vapor deposition (PVD). For the carbon material layer (diamond-like carbon), the surface-coating layer was formed by chemical vapor deposition (CVD). For the conductive polymer layer (polyaniline), the surface-coating layer was formed by electropolymerization. For the organic resin layer containing a conductive substance (carbon black-dispersed epoxy resin and graphite-dispersed phenol resin), the surface-coating layer was formed by applying a predetermined coating solution and then firing.

The carbon black-dispersed epoxy resin was obtained by dispersing carbon black particles with an average particle size of 50 nm in epoxy resin in a proportion of 20 mass %. The graphite-dispersed phenol resin was obtained by dispersing graphite particles with an average particle size of 3 μm in phenol resin in a proportion of 20 mass %.

In samples Nos. 45 and 47 to 50, the obtained metal sheet for separators was subjected to anodic electrolysis in a sulfuric acid aqueous solution of a temperature of 60° C. and a pH of 1 for 5 minutes with a current density of +1 mA/cm$^2$, to form a Sn-containing oxide layer on the surface of the surface-coating layer.

Each property was evaluated in the aforementioned manner using the obtained metal sheet for separators.

The coating form of the strike layer was regulated by determining the relationship with the electroplating time and the current density beforehand. The average thickness of the surface-coating layer and the average thickness of the Sn-containing oxide layer were each regulated by determining the relationship with the plating time, the anodic electrolysis time, the layer formation time in physical vapor deposition (PVD) or chemical vapor deposition (CVD), and the amount of the coating solution applied in the coating beforehand. For comparison, a metal sheet for separators having no strike layer was also prepared, and each property was evaluated in the aforementioned manner.

The coating ratio of the strike layer on the substrate and the maximum diameter of the island-like coating portions were measured by the following method.

First, each sample obtained by forming the strike layer on the surface of the substrate (0.05 mm in thickness) was cut to about 10 mm W×10 mm L. The coating form of the strike layer was observed using a scanning electron microscope (SEM), and the diameter of each island-like coating portion was measured and the maximum value of the diameters was determined.

Next, the coating portion and non-coating portion of the strike layer were binarized using image analysis software, to calculate the coating ratio of the strike layer on the substrate. Although the magnification in the SEM observation may be freely changed according to the maximum diameter of the coating portions, the magnification is preferably about 10000 to 100000.

The measurement of each of the coating ratio of the strike layer on the substrate and the diameter of each island-like coating portion was performed on 10 samples obtained by cutting the same sample having the strike layer to the aforementioned shape. The coating ratio of the strike layer on the substrate is the average coating ratio of the strike layer on the substrate of the 10 samples, and the maximum diameter of the island-like coating portions is the maximum value of the diameters of the island-like coating portions observed in the 10 samples.

Here, the composition of the strike made of an alloy layer of Ni and P was measured by an energy-dispersive X-ray spectrometer (EDX) used in the SEM observation.

Regarding the samples having no strike, "-" is shown in the fields of the coating ratio of the strike layer on the substrate and the maximum diameter of the island-like coating portion of the strike layer in Table 1.

The average thickness of the surface-coating layer was measured by the following method. The measurement method in the case where the average thickness is 1.0 μm or more is described first. Each sample obtained by forming the strike layer and the surface-coating layer on the surface of the substrate (0.05 mm in thickness) was cut to about 10 mm W×15 mm L. The sample was then embedded in resin, polished in the cross section, and then observed using a scanning electron microscope (SEM) to measure the thickness of the surface-coating layer. The measurement of the thickness of the surface-coating layer was performed on 10 samples obtained by cutting the same sample having the surface-coating layer to the aforementioned shape, and the average thickness of these samples was set as the average thickness of the surface-coating layer.

The measurement method in the case where the average thickness of the surface-coating layer is less than 1.0 μm and the method of measuring the average thickness of the Sn-containing oxide layer are described next. Each sample obtained by forming the strike layer and the surface-coating layer and, for Nos. 45 and 47 to 50, further the Sn-containing oxide layer on the surface of the substrate (0.05 mm in thickness) was processed by a focused ion beam to prepare a thin film for cross-section observation. The produced thin film for cross-section observation was then observed using a transmission electron microscope (TEM), to measure the average thickness of each of the surface-coating layer and the Sn-containing oxide layer. In the measurement of the average thickness of each of the surface-coating layer and the Sn-containing oxide layer, the thickness of each of the surface-coating layer and the Sn-containing oxide layer in the prepared thin film for cross-section observation was measured at three locations, and the average value of the three locations was set as the average thickness of the corresponding one of the surface-coating layer and the Sn-containing oxide layer.

Here, the composition of each of the surface-coating layer and the Sn-containing oxide layer was identified by an energy-dispersive X-ray spectrometer (EDX), X-ray diffractometer (XRD), laser Raman spectrometer, and/or Fourier transform infrared spectroscopic analyzer used in the SEM observation or TEM observation.

(Plating Bath Composition and Plating Condition of Strike Layer)
<Ni strike>
  Nickel chloride: 240 g/L
  Hydrochloric acid: 125 ml/L
  Temperature: 50° C.
<Ni-P strike>
  Nickel sulfate: 1 mol/L
  Nickel chloride: 0.1 mol/L
  Boric acid: 0.5 mol/L
  Sodium phosphite: 0.05 mol/L to 5 mol/L
  Temperature: 60° C.
<Cu strike>
  Copper cyanide: 30 g/L
  Sodium cyanide: 40 g/L
  Potassium hydroxide: 4 g/L
  Temperature: 40° C.
<Ag strike>
  Silver potassium cyanide: 2 g/L
  Sodium cyanide: 120 g/L
  Temperature: 30° C.
<Au strike>
  Gold potassium cyanide: 8 g/L
  Sodium citrate: 80 g/L
  Nickel sulfamate: 3 g/L
  Zinc acetate: 0.3 g/L
  Temperature: 30° C.

(Plating Bath Composition and Plating Condition of Surface-Coating Layer)
<Au>
  Gold potassium cyanide: 8 g/L
  Sodium citrate: 80 g/L
  Nickel sulfamate: 3 g/L
  Zinc acetate: 0.3 g/L Temperature: 30° C.
Current density: 1 A/dm²
<Ni₃Sn₂>
 Nickel chloride: 0.15 mol/L
 Tin chloride: 0.15 mol/L
 Potassium pyrophosphate: 0.45 mol/L
 Glycine: 0.15 mol/L
 Temperature: 60° C.
 Current density: 1 A/dm²
<TiN-dispersed Ni₃Sn₂>
 Nickel chloride: 0.15 mol/L
 Tin chloride: 0.15 mol/L
 Potassium pyrophosphate: 0.45 mol/L
 Glycine: 0.15 mol/L
 Temperature: 60° C.
 Current density: 1 A/dm²
 Average particle size of dispersed TiN: 1.5 μm In the disclosure, as long as a desired plating can be formed, a plating bath composition other than the above may be used according to a known plating method.

Table 1 summarizes the results of evaluating the corrosion resistance (stability in the separator use environment) and the adhesion property for each sample obtained as described above.

TABLE 1

| | | Sample preparation condition | | | | | |
|---|---|---|---|---|---|---|---|
| | | Strike layer | | | | | |
| Sample No. | Substrate | Type | Current density (A/dm²) | Electroplating time (sec) | Coating ratio of strike layer (%) | Maximum diameter of island-like coating portion (μm) | P content (mass %) |
| 1 | Stainless steel | N/A | — | — | — | — | — |
| 2 | SUS447J1 | Ni | 6 | 1 | 2 | 0.01 | — |
| 3 | | | 5 | 3 | 31 | 0.04 | — |
| 4 | | | 3 | 20 | 62 | 0.08 | — |
| 5 | | | 2 | 35 | 70 | 0.22 | — |
| 6 | | | 3 | 50 | 100 | Connected and unmeasurable | — |
| 7 | | Ni—P | 7 | 1 | 5 | 0.02 | 13 |
| 8 | | | 6 | 1.5 | 11 | 0.03 | 14 |
| 9 | | | 6 | 2.5 | 27 | 0.04 | 15 |
| 10 | | | 3 | 5 | 27 | 0.11 | 15 |
| 11 | | | 2.5 | 6 | 27 | 0.21 | 15 |
| 12 | | | 2 | 7.5 | 27 | 0.54 | 15 |
| 13 | | | 1.5 | 10 | 27 | 0.93 | 15 |
| 14 | | | 1 | 15 | 27 | 1.60 | 15 |
| 15 | | | 6 | 6 | 42 | 0.02 | 15 |
| 16 | | | 5 | 10 | 50 | 0.07 | 15 |
| 17 | | | 1 | 80 | 67 | 1.00 | 16 |
| 18 | | | 2 | 50 | 75 | 0.80 | 16 |
| 19 | | | 1 | 130 | 86 | 1.60 | 16 |
| 20 | | | 3 | 60 | 100 | Connected and unmeasurable | 17 |
| 21 | | Cu | 4 | 2 | 25 | 0.04 | — |
| 22 | | | 4 | 4 | 38 | 0.08 | — |
| 23 | | Ag | 4 | 3 | 30 | 0.06 | — |
| 24 | | | 4 | 7 | 48 | 0.10 | — |
| 25 | | Au | 4 | 1.5 | 16 | 0.04 | — |
| 26 | | | 4 | 3 | 33 | 0.06 | — |
| 27 | | Ni | 5 | 2.5 | 25 | 0.04 | — |
| 28 | | Ag | 5 | 1.5 | 18 | 0.03 | — |
| 29 | | | 1 | 80 | 84 | 0.80 | — |
| 30 | | N/A | — | — | — | — | — |
| 31 | | Ni—P | 6 | 2 | 20 | 0.03 | 15 |
| 32 | | | 1 | 130 | 86 | 1.60 | 16 |
| 33 | | Ni | 6 | 1 | 2 | 0.01 | — |
| 34 | | | 6 | 1 | 2 | 0.01 | — |
| 35 | | | 2 | 40 | 74 | 0.30 | — |
| 36 | | Ni—P | 6 | 2 | 20 | 0.04 | 15 |
| 37 | | | 1 | 130 | 86 | 1.60 | 16 |
| 38 | | Ni—P | 6 | 2 | 20 | 0.04 | 15 |
| 39 | | | 2.5 | 25 | 55 | 0.20 | 16 |
| 40 | | Au | 4 | 1.5 | 16 | 0.04 | — |
| 41 | | Ni | 5 | 2.5 | 25 | 0.04 | — |
| 42 | | | 2 | 40 | 74 | 0.30 | — |
| 43 | | Ni | 5 | 2.5 | 25 | 0.04 | — |
| 44 | | | 1.5 | 60 | 80 | 0.50 | — |
| 45 | Titanium | N/A | — | — | — | — | — |
| 46 | JIS 1 type | Ni | 5 | 2.5 | 28 | 0.04 | — |
| 47 | | Ni—P | 6 | 2 | 24 | 0.03 | 15 |
| 48 | | Cu | 4 | 2 | 25 | 0.05 | — |
| 49 | | Ag | 4 | 3 | 30 | 0.06 | — |
| 50 | | Au | 4 | 1.5 | 20 | 0.04 | — |

TABLE 1-continued

| | Sample preparation condition | | | | |
|---|---|---|---|---|---|
| | Surface-coating layer | | | Sn-containing oxide layer | |
| Sample No. | Type | Average thickness (μm) | Formation method | Main component | Average thickness (nm) |
| 1 | Au | 3.0 | Plating | — | — |
| 2 | | 1.0 | | — | — |
| 3 | | 1.0 | | — | — |
| 4 | | 1.0 | | — | — |
| 5 | | 1.0 | | — | — |
| 6 | | 1.0 | | — | — |
| 7 | | 1.0 | | — | — |
| 8 | | 1.0 | | — | — |
| 9 | | 1.0 | | — | — |
| 10 | | 0.5 | | — | — |
| 11 | | 1.0 | | — | — |
| 12 | | 3.0 | | — | — |
| 13 | | 1.0 | | — | — |
| 14 | | 1.0 | | — | — |
| 15 | | 1.0 | | — | — |
| 16 | | 1.0 | | — | — |
| 17 | | 1.0 | | — | — |
| 18 | | 1.0 | | — | — |
| 19 | | 5.0 | | — | — |
| 20 | | 1.0 | | — | — |
| 21 | | 1.0 | | — | — |
| 22 | | 1.0 | | — | — |
| 23 | | 1.0 | | — | — |
| 24 | | 1.0 | | — | — |
| 25 | | 1.0 | | — | — |
| 26 | | 1.0 | | — | — |
| 27 | Carbon black- | 10.0 | Firing after application | — | — |
| 28 | dispersed epoxy resin | 5.0 | | — | — |
| 29 | | 5.0 | | — | — |
| 30 | Graphite-dispersed | 3.0 | Firing after application | — | — |
| 31 | phenol resin | 5.0 | | — | — |
| 32 | | 5.0 | | — | — |
| 33 | Diamond-like carbon | 0.3 | CVD | — | — |
| 34 | | 1.0 | | — | — |
| 35 | | 0.1 | | — | — |
| 36 | TiN-dispersed | 2.0 | Plating | — | — |
| 37 | $Ni_3Sn_2$ | 5.0 | | — | — |
| 38 | $SnO_2$ | 0.1 | PVD | — | — |
| 39 | | 0.1 | | — | — |
| 40 | $TiO_2$ | 0.1 | PVD | — | — |
| 41 | TiN | 0.1 | PVD | — | — |
| 42 | | 0.1 | | — | — |
| 43 | Polyaniline | 1.0 | Electropolymerization | — | — |
| 44 | | 1.0 | | — | — |
| 45 | $Ni_3Sn_2$ | 3.0 | Plating | $SnO_2$ | 15 |
| 46 | | 1.0 | | — | — |
| 47 | | 1.0 | | $SnO_2$ | 15 |
| 48 | | 1.0 | | $SnO_2$ | 15 |
| 49 | | 1.0 | | $SnO_2$ | 15 |
| 50 | | 1.0 | | $SnO_2$ | 15 |

| | Total electric | | Evaluation result | | |
|---|---|---|---|---|---|
| Sample No. | charge for 100 hours (mC/cm²) | Peeling of surface-coating layer in tape removal test | Corrosion resistance after 100 hours | Adhesion | Remarks |
| 1 | 12.3 | Peeled | Excellent | Poor | Comparative Example |
| 2 | 14.0 | Not peeled | Excellent | Good | Example |
| 3 | 16.1 | Not peeled | Good | Good | Example |
| 4 | 17.4 | Not peeled | Good | Good | Example |
| 5 | 18.8 | Not peeled | Good | Good | Example |
| 6 | 398 | Not peeled | Poor | Good | Comparative Example |
| 7 | 12.6 | Not peeled | Excellent | Good | Example |
| 8 | 12.8 | Not peeled | Excellent | Good | Example |
| 9 | 13.5 | Not peeled | Excellent | Good | Example |
| 10 | 15.6 | Not peeled | Good | Good | Example |
| 11 | 15.8 | Not peeled | Good | Good | Example |
| 12 | 18.0 | Not peeled | Good | Good | Example |
| 13 | 19.5 | Not peeled | Good | Good | Example |
| 14 | 334 | Not peeled | Poor | Good | Comparative Example |
| 15 | 15.1 | Not peeled | Good | Good | Example |

TABLE 1-continued

| | | | | | |
|---|---|---|---|---|---|
| 16 | 16.3 | Not peeled | Good | Good | Example |
| 17 | 20.5 | Not peeled | Good | Good | Example |
| 18 | 165 | Not peeled | Poor | Good | Comparative Example |
| 19 | 211 | Not peeled | Poor | Good | Comparative Example |
| 20 | 384 | Not peeled | Poor | Good | Comparative Example |
| 21 | 12.3 | Not peeled | Excellent | Good | Example |
| 22 | 13.2 | Not peeled | Excellent | Good | Example |
| 23 | 12.5 | Not peeled | Excellent | Good | Example |
| 24 | 13.1 | Not peeled | Excellent | Good | Example |
| 25 | 12.0 | Not peeled | Excellent | Good | Example |
| 26 | 12.4 | Not peeled | Excellent | Good | Example |
| 27 | 65.5 | Not peeled | Good | Good | Example |
| 28 | 72.8 | Not peeled | Good | Good | Example |
| 29 | 119 | Not peeled | Poor | Good | Comparative Example |
| 30 | 56.7 | Peeled | Good | Poor | Comparative Example |
| 31 | 67.7 | Not peeled | Good | Good | Example |
| 32 | 216 | Not peeled | Poor | Good | Comparative Example |
| 33 | 69.9 | Not peeled | Good | Good | Example |
| 34 | 34.9 | Not peeled | Good | Good | Example |
| 35 | 219 | Not peeled | Poor | Good | Comparative Example |
| 36 | 64.1 | Not peeled | Good | Good | Example |
| 37 | 211 | Not peeled | Poor | Good | Comparative Example |
| 38 | 1.1 | Not peeled | Excellent | Good | Example |
| 39 | 113 | Not peeled | Poor | Good | Comparative Example |
| 40 | 1.5 | Not peeled | Excellent | Good | Example |
| 41 | 32.5 | Not peeled | Good | Good | Example |
| 42 | 174 | Not peeled | Poor | Good | Comparative Example |
| 43 | 54.5 | Not peeled | Good | Good | Example |
| 44 | 194 | Not peeled | Poor | Good | Comparative Example |
| 45 | 9.9 | Peeled | Excellent | Poor | Comparative Example |
| 46 | 38.5 | Not peeled | Good | Good | Example |
| 47 | 11.4 | Not peeled | Excellent | Good | Example |
| 48 | 10.9 | Not peeled | Excellent | Good | Example |
| 49 | 10.7 | Not peeled | Excellent | Good | Example |
| 50 | 10.1 | Not peeled | Excellent | Good | Example |

The table reveals the following points.

(a) The samples of Examples all had low current density after 100 hours in the corrosion resistance evaluation, and had favorable corrosion resistance even in the event of long exposure to high potential as in the separator use environment. In particular, Nos. 2, 7 to 9, 21 to 26, 38, 40, and 47 to 50 had excellent corrosion resistance. Moreover, the samples of Examples all had excellent adhesion property.

(b) The samples of Comparative Examples Nos. 1, 30, and 45 with no strike layer did not have desired adhesion property.

(c) The samples of Comparative Examples Nos. 6, 14, 18 to 20, 29, 32, 35, 37, 39, 42, and 44 with the coating ratio of the strike layer on the substrate and/or the maximum diameter of the island-like coating portion being outside the appropriate range had high current density after 100 hours in the corrosion resistance evaluation, and did not have desired corrosion resistance.

REFERENCE SIGNS LIST

1 membrane-electrode joined body
2, 3 gas diffusion layer
4, 5 separator
6 air passage
7 hydrogen passage

The invention claimed is:

1. A metal sheet for separators of polymer electrolyte fuel cells, comprising:
  a substrate made of metal; and
  a surface-coating layer with which a surface of the substrate is coated, with a strike layer in between,
  wherein a coating ratio of the strike layer on the substrate is 2% to 70%,
  the strike layer is distributed in a form of islands,
  a maximum diameter of the islands of the strike layer as coating portions is 1.00 µm or less and is not greater than a thickness of the surface-coating layer,
  the surface-coating layer is formed on a surface of the strike layer, and is made of a metal layer of Au, a metal oxide layer, a metal nitride layer, a metal carbide layer, a carbon material layer, a conductive polymer layer, an organic resin layer containing a conductive substance, or a mixed layer thereof, and
  the strike layer contains at least one element selected from the group consisting of Ni, Cu, and Ag.

2. The metal sheet for separators of polymer electrolyte fuel cells according to claim 1,
  wherein the strike layer is made of an alloy layer of Ni and P, and has a P content in a range of 5 mass % to 22 mass %.

3. The metal sheet for separators of polymer electrolyte fuel cells according to claim 1, wherein the strike layer is a Ni layer, a Cu layer, or a Ag layer.

* * * * *